Dec. 24, 1957  H. G. KLEMM  2,817,408
POWER TAKE-OFF DRIVE FOR TRACTORS
Filed March 30, 1954  4 Sheets-Sheet 1

INVENTOR.
HERMAN G. KLEMM
BY
ATTORNEYS.

Dec. 24, 1957  H. G. KLEMM  2,817,408
POWER TAKE-OFF DRIVE FOR TRACTORS
Filed March 30, 1954  4 Sheets-Sheet 2

INVENTOR.
HERMAN G. KLEMM
BY
ATTORNEYS.

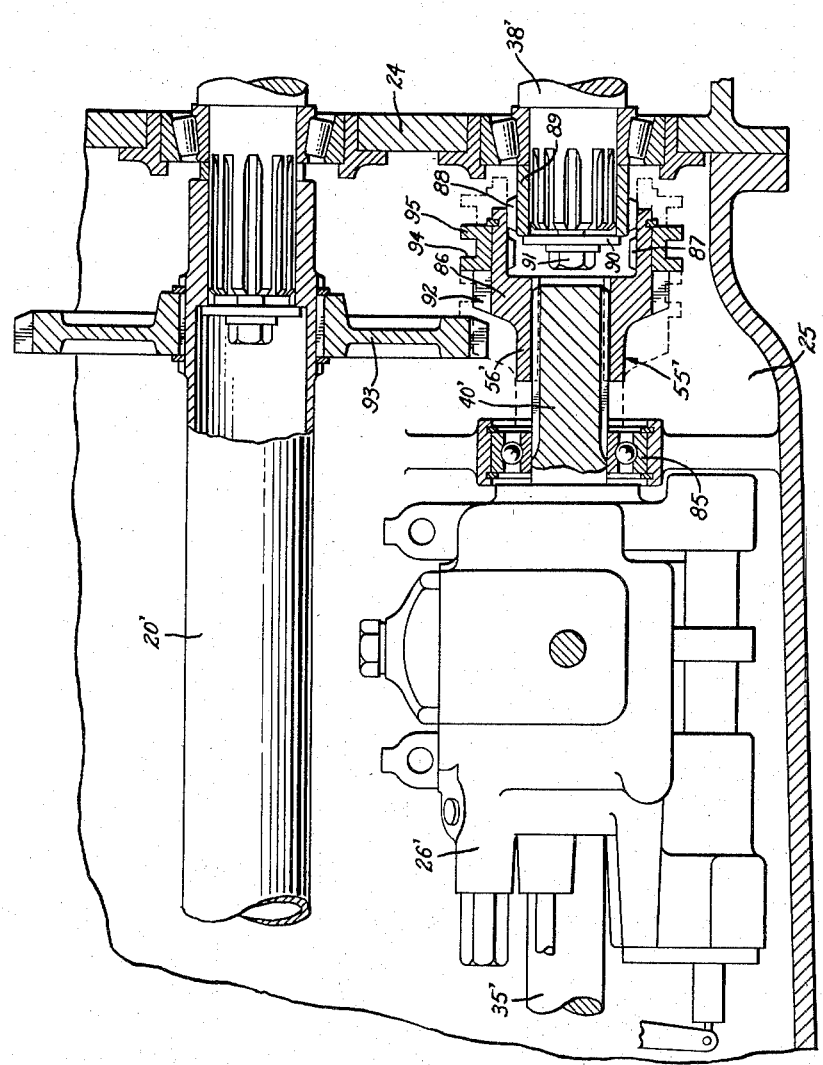

United States Patent Office 2,817,408
Patented Dec. 24, 1957

2,817,408

POWER TAKE-OFF DRIVE FOR TRACTORS

Herman G. Klemm, Birmingham, Mich., assignor, by mesne assignments, to Massey-Harris-Ferguson Inc., Racine, Wis., a corporation of Maryland Application March 30, 1954, Serial No. 419,652

2 Claims. (Cl. 180—53)

The invention relates to tractors of the type having a rear power take-off shaft for driving machines drawn by or mounted on the tractor, and it is more particularly concerned with an improved drive for the tractor power take-off shaft.

In the early stages of tractor development, proposals were made to provide a power take-off driven from the change-speed transmission. Later it became customary to provide a power take-off driven at the governed speed of the engine and, at the present time this is the standard practice of the tractor industry. A power take-off of that type is shown, for example, in the Ferguson United States Patent No. 2,223,002 issued November 26, 1940.

Power take-offs of the above general character accommodate the power requirements of many machines and implements used with tractors. They are not suited, however, for driving implements whose speed of operation must be proportioned to the distance traveled over the ground as, for example, seed planters. In implements of that type it has therefore been necessary to resort to such expedients as the use of a ground-wheel for driving purposes. The limited power available with ground-wheel drives seriously restricts the design of the implements and has other objectionable characteristics well known to those skilled in the art.

An object of the present invention is to overcome the above difficulties and provide a tractor power take-off drive that is instantly adaptable to condition it for driving any machine or implement commonly used with tractors.

Other objects and advantages of the invention will become apparent from the following detailed description of the preferred embodiments illustrated in the accompanying drawings in which Figure 1 is a longitudinal sectional view through the body of a tractor equipped with a power take-off drive embodying the features of the invention.

Fig. 4 is a fragmentary sectional view through the housing of a tractor equipped with a modified form of power take-off drive.

While particular embodiments of the invention have been shown and will be described herein, it is to be understood that this is merely exemplary and is not intended to limit the invention to the particular forms disclosed. The intention is to cover all modifications and all alternative construction falling within the spirit and scope of the invention as expressed in the appended claims.

Figure 1:
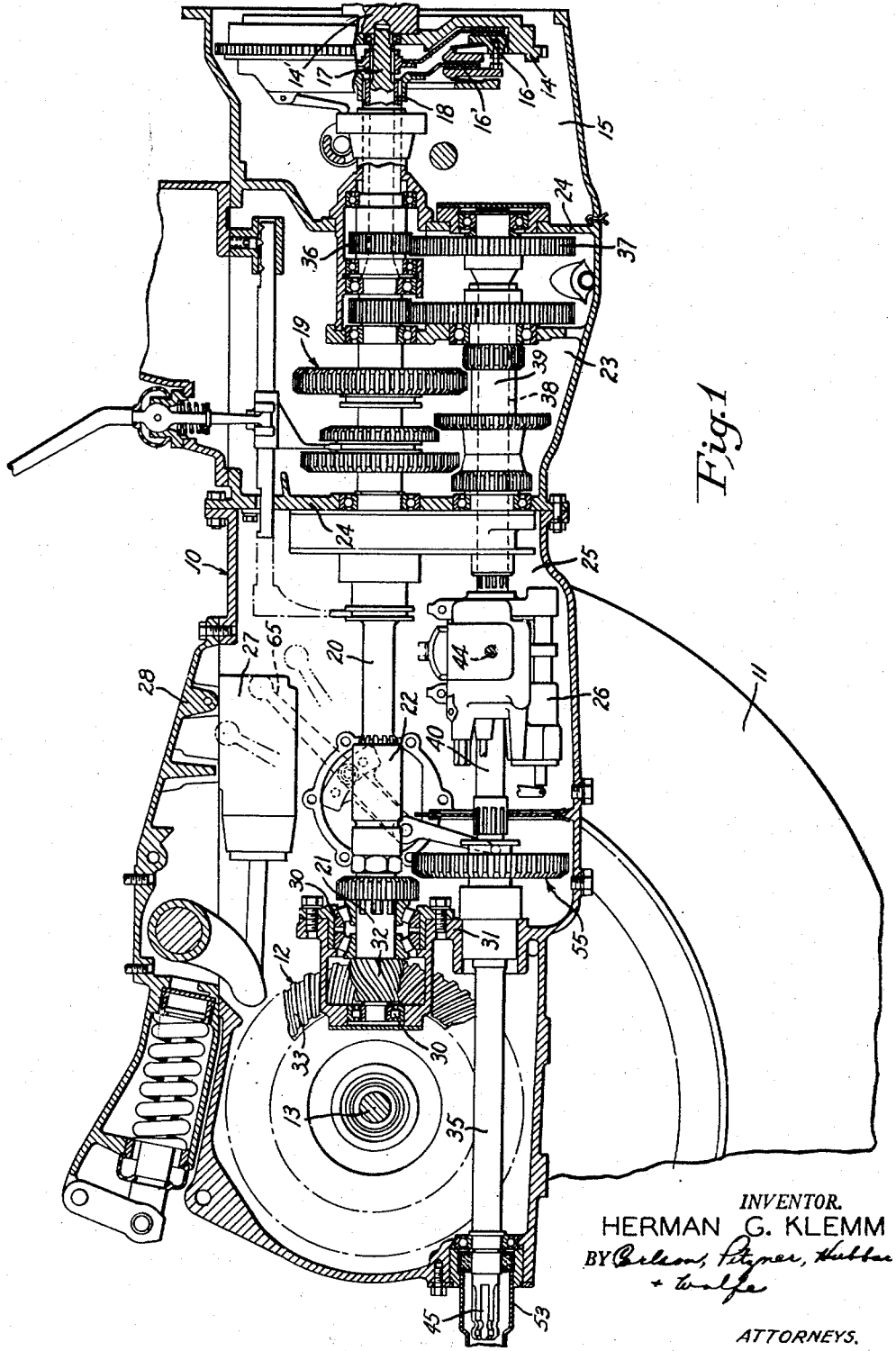

Referring to Fig. 1 of the drawings, the invention has been shown as incorporated in a tractor having a body or housing 10 adapted to be bolted at its forward end to an engine, and supported at its rear end by a pair of rubber tired drive wheels 11. The wheels may be mounted on the tractor housing in any preferred manner and are driven through a differential 12 connected with the wheels by axle shafts 13.

In the exemplary tractor, the engine crank shaft 14' is fitted with a flywheel 14 enclosed within a clutch compartment 15 at the forward end of the housing 10. Friction clutch mechanism associated with the flywheel including a front clutch 16 and a rear clutch 16' provide dependently engageable and disengageable drives for a pair of coaxial nested shafts 17 and 18 extending fore-and-aft of the housing. The inner shaft 17 in this instance serves to transmit engine power to the tractor drive wheel by way of a change-speed gear assembly 19 and a power delivery shaft, herein shown as comprising front and rear sections 20 and 21 drivingly connected by a coupling member 22.

The change-speed gearing 19 is enclosed in a compartment 23 immediately back of the clutch compartment 15 and defined by transverse walls or partitions 24 which support the rotating parts of the gearing. The rear partition 24 forms the front wall of a compartment 25 which houses various elements of the tractor hydraulic system including a pump 26, a lifting ram 27 and control mechanism (not shown) for the hydraulic system. The section of the rear housing defining the compartment 25 has an opening at the top normally closed by a cover plate 28 through which access is had to the mechanisms housed in the compartment.

As shown in Fig. 1, the power delivery shaft extends substantially centrally through the pump compartment 25 and its rear section 21 is journaled in antifriction bearings 30 carried on a wall or partition 31 extending transversely across the housing and separating the pump compartment 25 from the compartment enclosing the tractor differential. The shaft section 21 is drivingly connected to the tractor differential by a beveled pinion 32 meshing with the ring gear 33 of the differential.

In the exemplary tractor the second shaft driven by the rear clutch 16', that is the outer shaft 18, serves to drive the pump 26 and a power take-off shaft 35 projecting at the rear of the tractor housing. The shaft 18 is journaled on the front partition 24 and, through a pinion 36 and gear 37, drives a pump and power take-off drive shaft 38. The latter shaft as shown extends through the tubular intermediate shaft 39 of the change-speed gearing and into the pump compartment 25 below the power delivery shaft.

Figure 2:
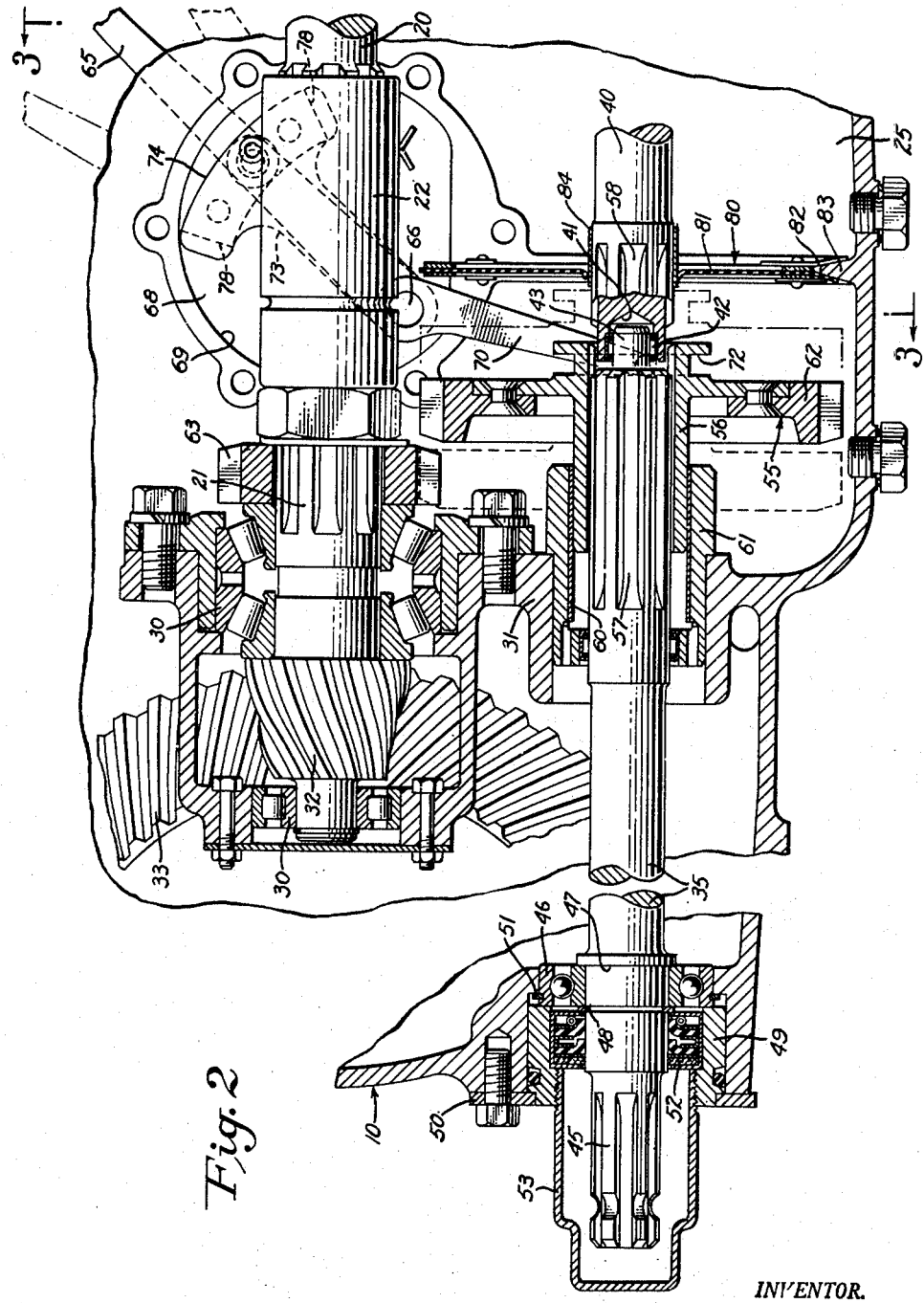
Fig. 2 is a fragmentary sectional view on an enlarged scale showing elements of the power take-off drive in greater detail.

The power take-off shaft 35 may be operably connected with the drive shaft 38 in various ways. In the preferred embodiment shown in Figs. 1 and 2 of the drawings, a short shaft 40 is interposed between the first mentioned shafts. The shaft 40, in this instance, constitutes the drive shaft of the pump 26. Preferably, it is piloted at opposite ends on the shafts 38 and 35. Thus, as shown in Fig. 2, one of the shafts has an axially opening recess 41 fitted with a suitable bearing such as a needle bearing 42 for reception of the reduced end portion 43 of the other shaft. The pump shaft and the pump are thus floatingly supported between the shafts 35 and 38. A pilot pin 44 coacting with the housing 10 and the pump restrains the latter against rotation with its shaft.

As shown in Fig. 2, the power take-off shaft 35 is supported with its rear end projecting at the rear of the tractor housing 10, the end of the shaft being splined as at 45 for connection with implements or machines to be driven. Support for the rear end of the shaft is provided by an antifriction bearing 46 having its outer race ring seated in a bore of the rear housing 10. The inner race ring of the bearing is confined between a shoulder 47 formed on the shaft and a locking ring 48 engaged in a groove in the shaft. To secure the assembly against endwise movement, a retaining sleeve 49 is removably clamped in the bore as by a locking ring 50 bolted to the tractor housing. As herein shown, the outer bearing race ring is fitted with an outwardly projecting stop ring 51 and the sleeve 49 acts to clamp the latter against a rearwardly facing shoulder formed on the walls of the bore. The sleeve 49 accommodates a sealing device 52 to prevent leakage of oil from the housing and it is threaded internally for the reception of a removable guard or cap 53 provided for the protection of the power take-off shaft when not in use.

To provide for driving the power take-off shaft 35 at speeds proportioned either to the governed engine speed or to the ground speed of the tractor, selectively operable means is incorporated in the drive whereby the shaft 35 may be drivingly coupled with the power take-off and pump drive shaft or alternatively with the power delivery shaft of the tractor. This selectively operable means is also arranged so that the drive of the power take-off shaft may be interrupted at will.

Referring to Fig. 2 of the drawings, the selectively operable means in its preferred form comprises a combined clutch and gear assembly 55 having tubular cylindrical body or hub 56 internally splined for mating engagement for complemental splines 57 and 58 formed respectively on the adjacent ends of the power take-off shaft 35 and the pump shaft 40. The hub 56 is supported for rotation and for endwise sliding movement in a bearing bushing 60 carried by a sleeve-like bearing member 61 seated in a bore in the transverse wall 31 of the housing. The hub and coacting bearing elements thus provide bearing support for the forward end of the power take-off shaft 35.

Rigid with the hub 56 is a gear element 62 adapted in one position of the assembly to coact with a pinion 63 splined or otherwise non-rotatably fixed on the power delivery shaft. In the embodiment illustrated in Figs. 1 and 2, pinion 63 is splined to the rear section 21 of the power delivery shaft closely adjacent the front bearing 30 for that shaft section.

The slidable mounting of the clutch and gear assembly 55 permits it to be shifted forwardly to the position shown in broken lines in Fig. 2, wherein the hub 56 extends over both the shaft 35 and the shaft 40 to drivingly connect the shafts. In other words, with the clutch and gear assembly in its forward position, the power take-off shaft is driven from the shaft 38 at a speed proportioned to the governed engine speed regardless of whether the tractor is stationary or running and independently of the setting of the change-speed gears.

To interrupt the driving connection for the power take-off shaft, the clutch and gear assembly 55 is shifted to the intermediate position in which it is shown in full lines in Fig. 2. In this position, the hub 56 is disengaged from the splined portion of the shaft 40. Consequently neither the power take-off shaft nor the clutch and gear assembly rotate. Further rearward shifting of the assembly to the position shown in dotted lines in Fig. 2 brings the gear 62 into mesh with the pinion 63. This completes the alternative drive for the power take-off shaft which is thereby rotated at a speed proportioned to the rate at which the tractor is travelling.

Figure 3:
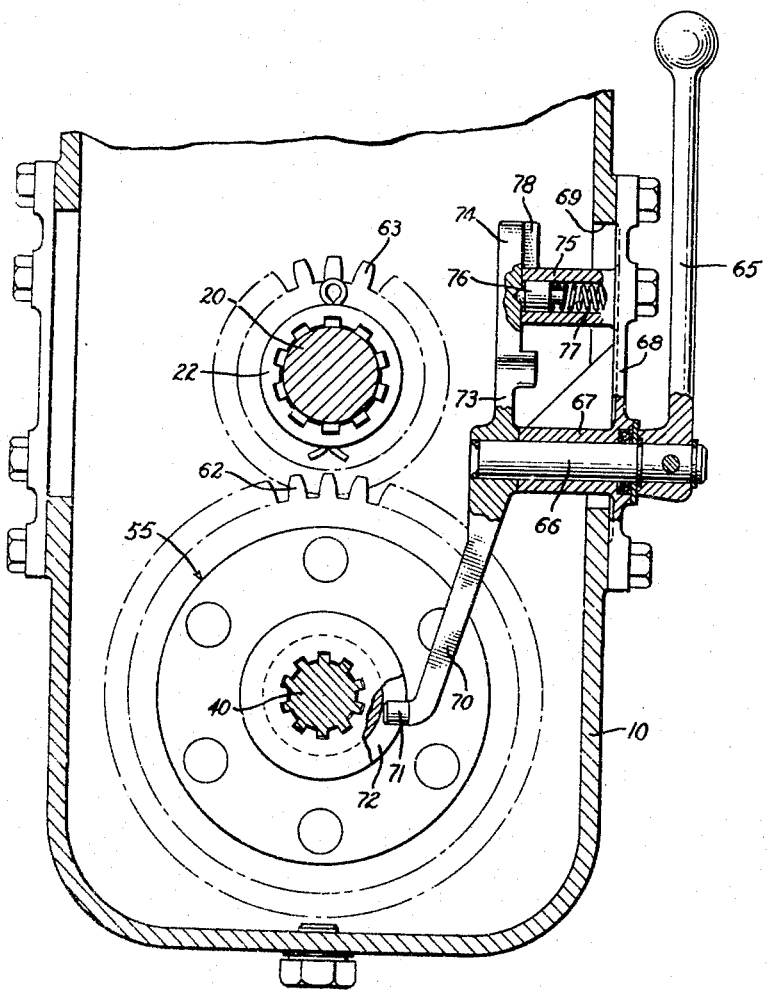
Fig. 3 is a transverse sectional view through the tractor body taken in off-set planes substantially on the line 3—3 of Fig. 2 showing the manual selector for the drive.

While any preferred means may be utilized for shifting the clutch and gear assembly 55, a manually operable control in the form of a hand lever 65 is provided for that purpose in the exemplary tractor. As shown in Fig. 3, the hand lever is pinned or otherwise non-rotatably fixed on the projecting outer end of a shaft 66 journaled in a hollow boss 67 projecting from the inner wall of a cover plate 68 bolted to the housing 10 to cover an access opening 69 in a side wall of the housing. At its inner end, the shaft 66 carries a shifter arm 70 having a tip portion 71 engaged in the circumferential groove 72 in the body of the clutch and gear assembly.

By rocking the hand lever 65, the clutch and gear assembly may thus be shifted to any one of the three positions above described. Provision is made for releasably latching the assembly in adjusted position. For that purpose the shifter arm 70 is formed with an extension 73 terminating in a segmental end portion 74 adapted to wipe over the end of an inwardly projecting boss 75 on the cover plate 68. The end portion 74 has a series of appropriately shaped depressions in its outer face for coaction with the tapered nose of a detent element 76 slidable in a bore in the boss 75. A spring 77 within the bore urges the detent element outwardly to engage in the depression presented opposite the boss. It will be understood that the detent and depressions are shaped so that the assembly is held securely in adjusted position yet may be shifted to an alternate position by application of relatively small force to the hand lever 65.

Provision is made for restraining the hand lever 65 and associated elements against movement beyond the positions in which the clutch and gear assembly is respectively engaged with the shaft 40 and the pinion 63. The restraining means as shown comprises abutments 78 in the form of flanges at opposite ends of the segmental arm portion 74 and projecting laterally therefrom for engagement with the sides of the boss 75.

It will be evident from the foregoing that the power take-off drive illustrated in Figs. 1–3 of the drawings permits the power take-off shaft 35 to be stopped when not in use or to be driven either at a speed proportioned to the governed speed of the tractor engine or, alternatively, at a speed directly proportioned to the ground speed of the tractor. The speed changes may be effected easily and instantly by the simple manipulation of the hand lever 65. Moreover, while the pump and the power take-off shaft have a common driving connection with the tractor engine, changes in the power take-off drive do not affect the pump which is driven continuously at governed engine speed. This insures an adequate supply of pressure fluid for the tractor hydraulic system under any operating conditions.

It will also be observed that with the speed selecting arrangement above described, the gear 62 is not rotated when the power take-off drive is interrupted. Thus, the oil in the pump compartment is not churned unnecessarily. In any event, the effect on the hydraulic system of any aeration of the oil resulting from rotation of the gear 62 is minimized by the location of that gear substantially rearwardly of the pump. If desired, the section of the compartment containing the oil for the hydraulic system may be isolated from the section in which the gear is located by a partition 80 interposed between the pump and the gear. A partition suitable for that purpose is shown as comprising a diaphragm 81 of oil resistant sheeting clamped in a metal frame 82 dimensioned to fit snugly crosswise of the compartment 25. Preferably, the frame is constructed to present at its bottom and side edges a V-shaped groove for coaction with a complemental rib 83 provided on the inner wall of the housing. The diaphragm 81, when extended above the pump shaft 40, is provided with an aperture and sealing sleeve 84 for accommodating the shaft.

In the modified form of the drive mechanism shown in Fig. 4 of the drawings, the gearing providing the selective drive for the power take-off shaft is located at the forward end of the pump compartment 25 ahead of the pump 26'. As in the tractor previously described, power is transmitted to the tractor drive wheels through change-speed gearing and a power delivery shaft 20' extending through the front wall 24 of the pump compartment. Power for driving the pump and the power take-off shaft 35' is transmitted through a separate drive shaft 38' extending into the pump compartment below the power delivery shaft. The power take-off shaft in this case may be integral with or suitably coupled to the pump shaft 40′ which is supported in coaxial alinement with the shaft 38′ as by a bearing 85 carried on the housing.

A combined clutch and gear assembly 55′ has its hub portion 56′ splined or otherwise mounted on the shaft 40′ for rotation with that shaft and for endwise sliding movement thereon. In the particular form shown, the hub 56′ has an enlargement 86 formed with a forwardly opening recess adapted to telescope over the adjacent end of the shaft 38′. Splines or teeth 87 on the interior wall of the recess are adapted to mesh with complemental teeth 88 formed on a collar 89 non-rotatably mounted on the shaft 38′ and held in place thereon by a collar 90 secured to the end of the shaft as by a screw 91. By sliding the assembly 55′ forwardly to the position shown in broken lines in the drawings, a driving connection is completed for rotating the power take-off shaft 35′ from the engine driven shaft 38′ at a speed proportioned to the governed engine speed.

The hub enlargement 86 is also formed with external gear teeth 92 adapted to mesh with the teeth of a gear 93 when the assembly 55′ is shifted rearwardly to the position shown in dotted lines. The gear 93 is keyed or otherwise non-rotatably fixed on the power delivery shaft 20′ which drives the rear wheels of the tractor. Accordingly, when the gears 92 and 93 are engaged, the power take-off shaft is driven at a speed directly proportioned to the ground speed of the tractor.

Preferably, the parts of the assembly 55′ are so dimensioned that in the intermediate position in which it is shown in full lines in the drawings, both drives are interrupted and both the pump and the power take-off shaft are stopped. Shifting of the assembly between the three operative positions may be effected by a hand lever such as that heretofore described having a shifter fork engaging in a circumferential groove 94 in a shifter ring 95 suitably anchored to the enlarged portion of the hub 56′.

I claim as my invention:

1. The combination with a tractor having a speed change transmission with a power delivery shaft for driving the rear traction wheels and a pump and power take-off drive shaft, said shafts being driven independently through a dual friction clutch mechanism associated with the engine flywheel, of a power take-off shaft projecting at the rear of the tractor, selector mechanism shiftable manually to a plurality of positions, said mechanism having means operative in one position for establishing a driving connection between said drive shaft and said power take-off shaft, and other means operative in another position of said mechanism to establish a driving connection between the power delivery shaft and said power take-off shaft, said mechanism being operative in a third position to interrupt the drive for said power take-off shaft.

2. In a tractor having rear traction wheels driven from an engine through change-speed gearing located ahead of the wheels and driving through a rearwardly extending power delivery shaft, of a power take-off shaft projecting at the rear of the tractor, a drive shaft coupled to the engine crank shaft ahead of the change-speed gearing extending parallel to the power delivery shaft and axially alined with the power take-off shaft, a pump having a shaft coupled to the rear end of said drive shaft and piloted at its rear end in the forward end of said power take-off shaft, the adjacent ends of said power take-off and pump shafts being formed with splines, a clutch and gear assembly including an internally splined hub portion slidable on said power take-off shaft between an intermediate position and either of two extreme positions, a pinion on said power delivery shaft, said assembly being operative in one extreme position to engage the splined end of said pump shaft to drivingly connect it with the power take-off shaft and operative in the other extreme position to interrupt the engagement with the pump shaft and to engage the gear of the assembly with said pinion whereby to drive the power take-off shaft at a speed proportioned to the ground speed of the tractor.

References Cited in the file of this patent

UNITED STATES PATENTS

| 2,034,778 | Storey | Mar. 24, 1936 |
| 2,661,634 | Bechman et al. | Dec. 8, 1953 |

FOREIGN PATENTS

| 266,812 | Switzerland | May 1, 1950 |